US009031678B2

(12) United States Patent
Lien

(10) Patent No.: US 9,031,678 B2
(45) Date of Patent: May 12, 2015

(54) AUDIO TIME STRETCH METHOD AND ASSOCIATED APPARATUS

(75) Inventor: Chu-Feng Lien, Hsinchu County (TW)

(73) Assignee: Mstar Semiconductor, Inc., Hsinchu County (TW)

( * ) Notice: Subject to any disclaimer, the term of this patent is extended or adjusted under 35 U.S.C. 154(b) by 303 days.

(21) Appl. No.: 13/419,609

(22) Filed: Mar. 14, 2012

(65) Prior Publication Data

US 2012/0239176 A1 Sep. 20, 2012

(30) Foreign Application Priority Data

Mar. 15, 2011 (TW) ............................ 100108830 A

(51) Int. Cl.
*G06F 17/00* (2006.01)
*G10L 21/047* (2013.01)

(52) U.S. Cl.
CPC .................................... *G10L 21/047* (2013.01)

(58) Field of Classification Search
CPC . G10L 19/005; G10L 2013/021; G10L 21/04; G10L 21/43; G11B 20/00007; G11B 20/10527; G11B 27/005; G11B 27/007; H04N 21/4392; H04N 21/4394
See application file for complete search history.

(56) References Cited

U.S. PATENT DOCUMENTS

| | | | | |
|---|---|---|---|---|
| 7,236,837 | B2 * | 6/2007 | Matoba | 700/94 |
| 7,526,351 | B2 * | 4/2009 | He et al. | 700/94 |
| 7,885,720 | B2 * | 2/2011 | Nagase et al. | 700/94 |
| 2004/0204945 | A1 * | 10/2004 | Okuda et al. | 704/500 |
| 2005/0058145 | A1 * | 3/2005 | Florencio et al. | 370/412 |
| 2007/0186146 | A1 * | 8/2007 | Lakaniemi et al. | 715/500.1 |
| 2007/0201656 | A1 * | 8/2007 | Lakaniemi et al. | 379/201.01 |
| 2008/0114606 | A1 * | 5/2008 | Ojala et al. | 704/500 |
| 2008/0267224 | A1 * | 10/2008 | Kapoor et al. | 370/516 |
| 2011/0011245 | A1 * | 1/2011 | Adam et al. | 84/612 |
| 2011/0077945 | A1 * | 3/2011 | Ojala et al. | 704/262 |
| 2011/0099021 | A1 * | 4/2011 | Zong et al. | 704/503 |

OTHER PUBLICATIONS

Taiwan Patent Office, "Office Action", Jul. 5, 2013.
Juan Carlos De Martin, Takahiro Unno, and Vishu Viswanathan, "Impoved Frame Erasure Concealment for Celp-Based Coders," IEEE Int. Conf. on Acoustic, Speech, and Signal Processing, ICASSP' 00, vol. 3, pp. 1483-1486, 2000.

* cited by examiner

*Primary Examiner* — Andrew C Flanders
(74) *Attorney, Agent, or Firm* — WPAT, PC; Justin King

(57) ABSTRACT

An audio time stretch method and associated apparatus is provided. The method includes steps of calculating an energy level according to amplitudes of a plurality of received data, and determining whether the audio data requires audio time stretch according to the energy level. Audio data with lower energy level and volume are selectively time-stretched to alleviate audio quality degradation.

17 Claims, 3 Drawing Sheets

AUDIO TIME STRETCH METHOD AND ASSOCIATED APPARATUS

This application claims the benefit of Taiwan application Serial No. 100108830, filed Mar. 15, 2011, the subject matter of which is incorporated herein by reference.

BACKGROUND OF THE INVENTION

1. Field of the Invention

The invention relates in general to an audio time stretch method and associated apparatus, and more particularly to a method for audio time stretch by utilizing audio data with low energy and associated apparatus.

2. Description of the Related Art

Internet real-time audio/video transmission techniques, e.g., Voice over Internet Protocol (VoIP), offer people immediate and realistic multimedia services, and are thus one of the most important research and development targets for information technology developers.

In Internet real-time audio/video transmission, a transmitting end samples, digitalizes and encodes audio to be transmitted into a plurality of digital audio data each corresponding to an amplitude sample of the audio. A certain number of audio data are packaged in an Internet packet, which is transmitted to a receiving end. Upon receiving the packet at the receiving end, the packet is de-packetized, decoded and demodulated to the original digital audio data. The digital audio data are digital-to-analog converted to restore the original analog audio data that are then played.

At the transmitting end, each audio data corresponds to a predetermined sampling time sequence. Therefore, at the receiving end, it is essential that the audio data be digital-to-analog converted according to the same sampling time sequence, so as to reconstruct the audio to be transmitted by the transmitting end. In order to perform digital-to-analog conversion according to the predetermined time sequence, the receiving end needs to provide the audio data to the digital-to-analog converting mechanism according to a specific time sequence. However, since the audio data are obtained from the packets, the quality of audio played at the receiving end is undesirably affected in the event that the time sequence of the packets transmitted to the receiving end is irregular.

The time sequence of packets transmitted in the Internet real-time audio/video transmission is in fact affected by various factors, e.g., jitter and clock drift. When the packets are transmitted via the Internet, the packets arrive at the receiving end after being routed through different paths due to Internet protocols, such that the packets do not arrive at the receiving end according to the time sequence based on which they are transmitted—such is referred to as "jitter". Further, different reference clocks utilized by the transmitting end and the receiving end may also lead to differences in the packets transmitted. For example, suppose a packet length according to a predetermined protocol is 10 ms, the transmitting end transmits an audio packet every 10.01 ms, and the receiving end plays a packet every 9.99 ms. In a period during which 100 packets are transmitted, an acknowledgement time difference between the two ends reaches as high as 2 ms—such is referred to as "clock drift".

At the receiving end, in order to provide audio data to the digital-to-analog conversion mechanism according to a predetermined time sequence, audio time stretch is required by the time sequence. When the receiving end fails to in time acquire the audio data from the packets, additional audio data needs to be inserted; in contrast, the receiving end removes/discards a certain amount of audio data when the packets provide more audio data than the receiving end can buffer.

However, inappropriate time stretch may degrade the quality of audio playback such that noticeable audio imperfections are observed by a listener at the receiving end.

SUMMARY OF THE INVENTION

The present invention discloses a method for audio time stretch comprises receiving a plurality of audio data, calculating an energy level according to amplitudes of the audio data, and selectively performing a waveform search for the audio data according to the energy level. Preferably, the waveform search is performed when the energy level is lower than a threshold. Preferably, a plurality of third audio data among the audio data are selected to be removed according to waveform similarities in the audio data. Upon identifying the removable audio data, a removable flag is set as an enable value. A plurality of fourth audio data among the audio data are selected as addible audio data according to waveform similarities. An addible flag is set as an enable value upon identifying the addible audio data.

When providing the audio data to a digital-to-analog conversion mechanism, an audio repository is checked. When the audio repository is greater than a water level and the removable flag matches the enable value, the removable audio data are removed from the audio data. Alternatively, when the audio repository is lower than the water level and the addible flag matches the enable value, the addible audio data are inserted into the audio data.

Preferably, the threshold is adjustable by a feedback mechanism. To process another plurality of second audio data after having outputted the above audio data, the threshold is updated according to the energy level of the above audio data. An energy level of the second audio data is compared with the updated threshold to selectively perform the waveform search.

The present invention further discloses an apparatus comprising an energy level module, a waveform search module, a determining module, a threshold module, a flag register and a buffer control module. The energy level module calculates a corresponding energy level according to amplitudes of a plurality of audio data. The determining module determines whether the waveform search module performs a waveform search among the audio data according to the energy level. Preferably, when an energy level of a predetermined amount of audio data is greater than a threshold, the waveform search module stops the waveform search among the predetermined amount of audio data. When the energy level is smaller than the threshold, the waveform search module performs the waveform search among the predetermined number of audio data, and identifies removable audio data and addible data from the predetermined amount of audio data according to waveform similarities. Further, a removable flag and an addible flag in the flag register are respectively set as an enable value.

The buffer control module checks an audio repository. When the audio repository is greater than a water level and the removable flag matches the enable value, the buffer control module removes the removable audio data from the predetermined number of audio data. Alternatively, when the audio repository is lower than the water level and the addible flag matches the enable value, the buffer control module inserts the addible audio data into the predetermined number of audio data.

The threshold module provides the threshold, and updates the energy level for a current audio data according to the energy level of a previous audio data.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
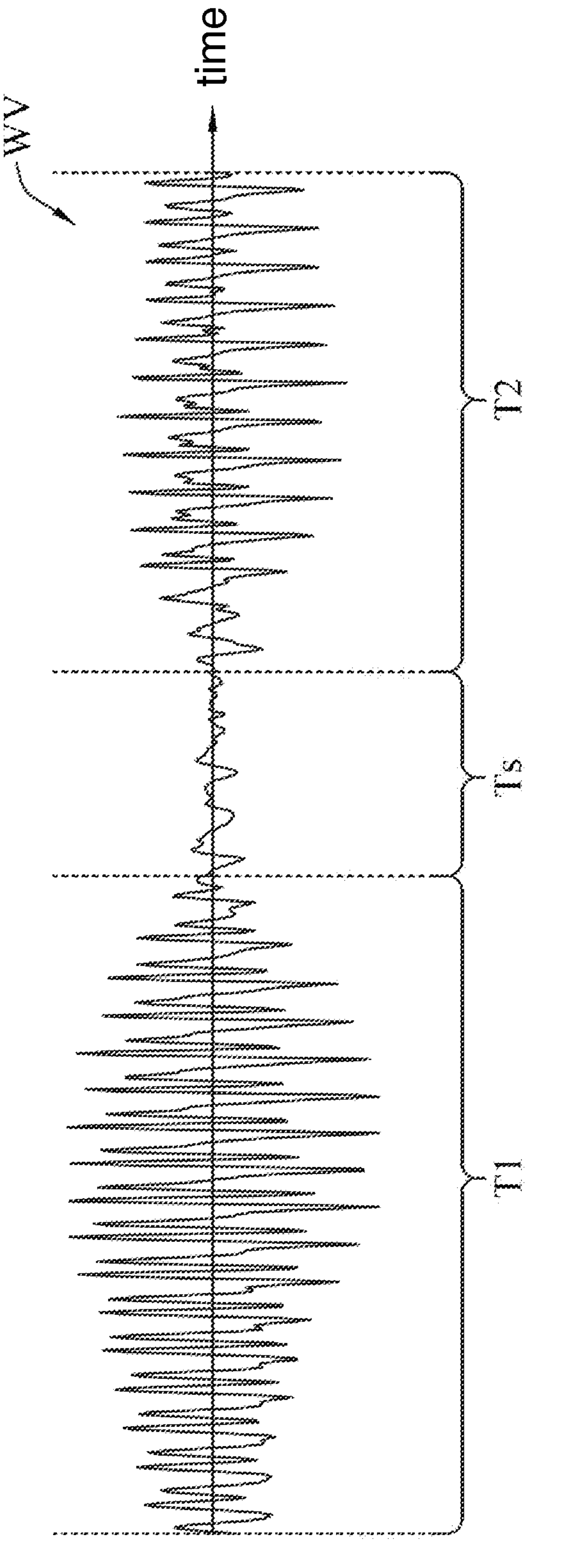
FIG. 1 shows an audio waveform.

FIG. 1 shows an audio waveform WV, with a horizontal axis representing the time. The audio waveform WV comprises a low-volume portion. For example, a continuous voice audio is consisted of many independent syllables, between which are short voice intervals. An instantaneous energy level of the voice intervals is reduced and significance of the voice intervals is also lower. For example, two syllables are respectively present during time periods T1 and T2 in the audio WV, with a root mean square (RMS) energy level thereof respectively reaching −18 dB and −22 dB. A time period Ts is a voice interval between the two syllables, with an RMS energy level being only −34 dB. It is a target of the present invention to utilize the time period with a lower energy level to perform audio time stretch in order to minimize audio quality degradation resulted from time stretch.

Figure 2:
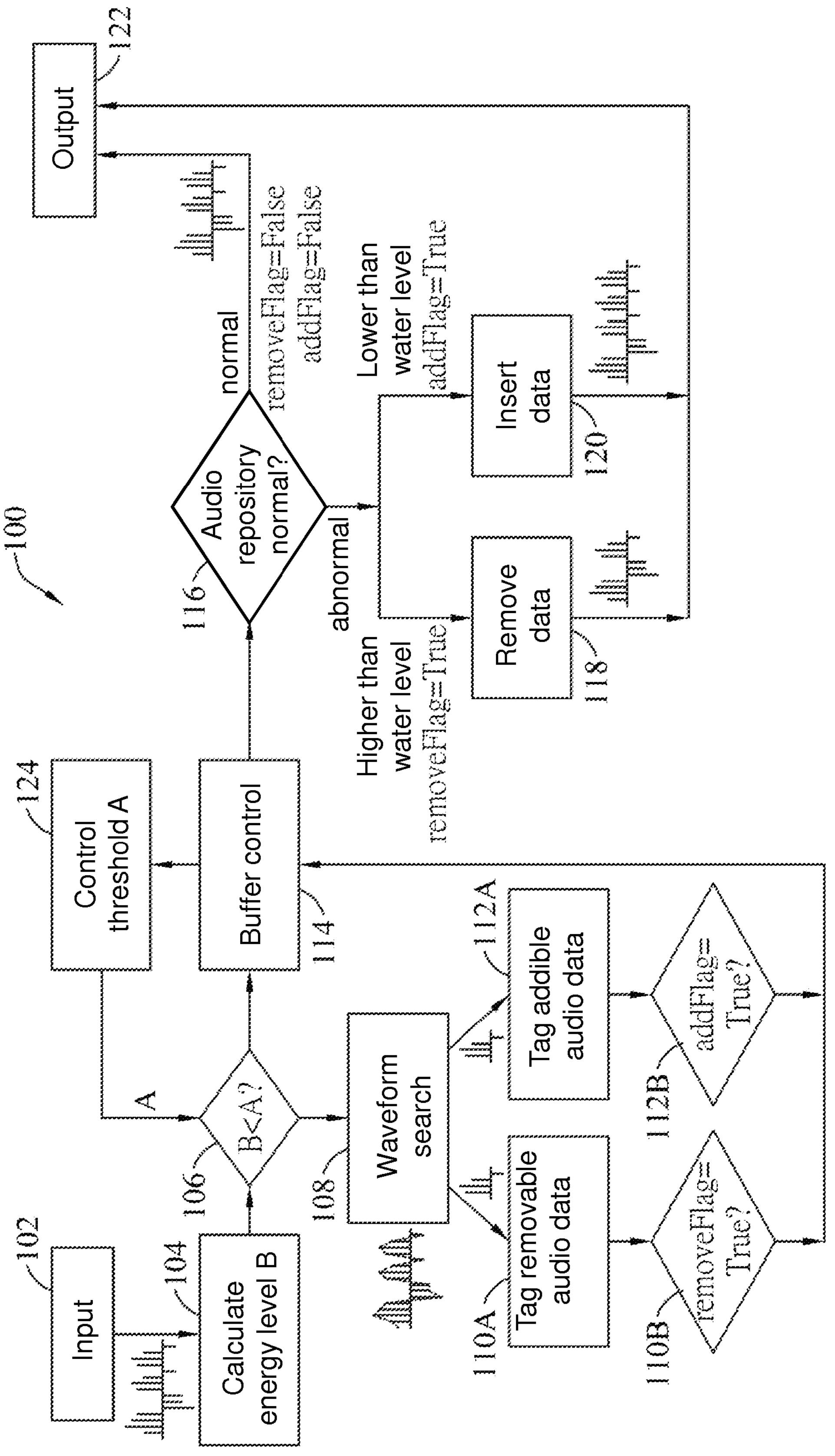
FIG. 2 is a flowchart of a method for audio time stretch according to an embodiment of the present invention.

FIG. 2 shows a flowchart of a method for audio time stretch according to an embodiment of the present invention. The audio time stretch method is applicable to a receiving end of Internet real-time audio/video transmission.

In Step 102, a plurality of audio data as input are received. For example, the plurality of audio data are provided by a de-packetizing/decoding /demodulating mechanism in the receiving end. For example, the plurality of audio data are obtained from a same packet, and are pulse code modulation (PCM) audio data.

In Step 104, a corresponding energy level B of the audio data is calculated according to amplitudes of the audio data. For example, the energy level B is calculated according to the RMS of the amplitudes of the audio data.

In Step 106, the energy level B is compared with a threshold A. Step 108 is performed when the energy level B is smaller than the threshold A, or else Step 114 is performed.

In Step 108, a waveform search is performed. For example, a first number of audio data as removable audio data and a second number of addible audio data are selected from the plurality of audio data. The removable audio data and the addible audio data may be the same or different, and the first number and the second number may be the same or different. Preferably, the waveform search may be performed according to the waveform similarity based synchronized overlap-add (WSOLA) algorithm or similar derived algorithms to identify the removable and addible audio data. Among the audio data, a set of audio data may serve as the removable audio data when the waveform of the set of audio data is similar to that of a neighboring set of audio data. When the set of audio data is removed from the audio data, a count of the audio data is decreased without changing a pitch to reduce a time period of the audio data. Based on similar principles, the addible audio data are identified to increase the count of the audio data without changing the pitch to lengthen the time period of the audio data.

In Step 110A, a position and/or start and end points of the removable audio data are tagged, and a flag removeFlag (i.e., the removable flag) is set as logic true (i.e., an enable value, indicated as True in FIG. 2).

In Step 110B, the method proceeds to Step 114 when the flag removeFlag is logic true. Other additional processing steps (not shown) can be performed when the flag removeFlag is set as logic true. For example, parameters of the waveform search are modified to iterate the waveform search in Step 108, or the removable audio data are identified according to other principles.

In Step 112A, when the addible audio data are identified, a position and/or start and end points of the addible audio data are tagged, and another flag addFlag (i.e., the addible flag) is set as logic true.

In Step 112B, the method proceeds to Step 114 when the flag add Flap is logic true.

In Step 116, an audio repository is checked to determine whether a count of the audio data being buffered satisfies a time sequence of a digital-to-analog conversion mechanism. When the audio repository is normal, Step 122 is performed, and the flags removeFlag and addFlag are reset to logic false. In contrast, when the audio repository is abnormal and encounters overflow or underflow, Step 118 or 120 is performed according to statuses of the flags removeFlag and addFlag. For example, when the audio repository is greater than a predetermined water level and the flag removeFlag is logic true, Step 118 is performed; when the audio repository is lower than the water level and the the flag addFlag is logic true, Step 120 is performed. A repository greater than the water level indicates a count of the audio data is excessive so that a part of the audio data needs to be removed. When the flag removeFlag is logic true, it means that the removable audio data are identified from the original audio data by Step 110A, so as to perform Step 118. When the flag removeFlag is not logic true, other additional processing steps (not shown) may be performed. For example, the removable audio data are identified according to other principles. Further, a repository lower than the water level means the count of the audio data falls short so that the count of the audio data needs to be increased. When the flag addFlag is logic true, it indicates that the addible audio data from the original audio data are identified, and Step 120 is performed.

In Step 118, the removable audio data are selectively removed from the original audio data. For example, the removable audio data are selectively removed according to the tags set in Step 110A to reduce the time period of the audio data.

In Step 120, the addible audio data are inserted into the original audio data. For example, the addible audio data are inserted according to the tags in Step 112A to lengthen the time period of the audio data.

In Step 122, the audio data are outputted. For example, the audio data are outputted according to a digital-to-analog conversion mechanism (not shown) at the receiving end.

In Step 124, when providing the threshold A for the audio data, the threshold A may be updated according to one or more previous audio data (e.g., an energy level thereof). By appropriately adjusting the threshold A, a minimal overall energy level of the audio is reflected by the threshold A to correctly distinguish the voice intervals between the syllables. For example, when buffering the (n-1)th audio data, supposing a corresponding energy level B[n-1] is smaller than a current threshold A[n-1], a threshold A[n] smaller than the threshold A[n-1] is applied for the (n)th audio data. Conversely, supposing the energy level B[n-1] is greater than the threshold A[n-1], the threshold A[n] equal to the threshold A[n-1] is provided. However, in the event that the energy level of a continuous number of audio data is greater than the threshold A, the threshold A may be increased when updating the threshold A. It is known to a person skilled in the art that other approaches for dynamically adjusting the threshold A may be applied so that the threshold A is given adequate discernment.

It is observed from Step 106 that, the present invention utilizes a period having lower energy level and volume in the audio to perform audio time stretch, so that audio quality imperfections due to time stretch are masked by parts that are likely to stay unnoticed from a listener and thus reduce audio quality degradation resulted from time stretch.

Figure 3:
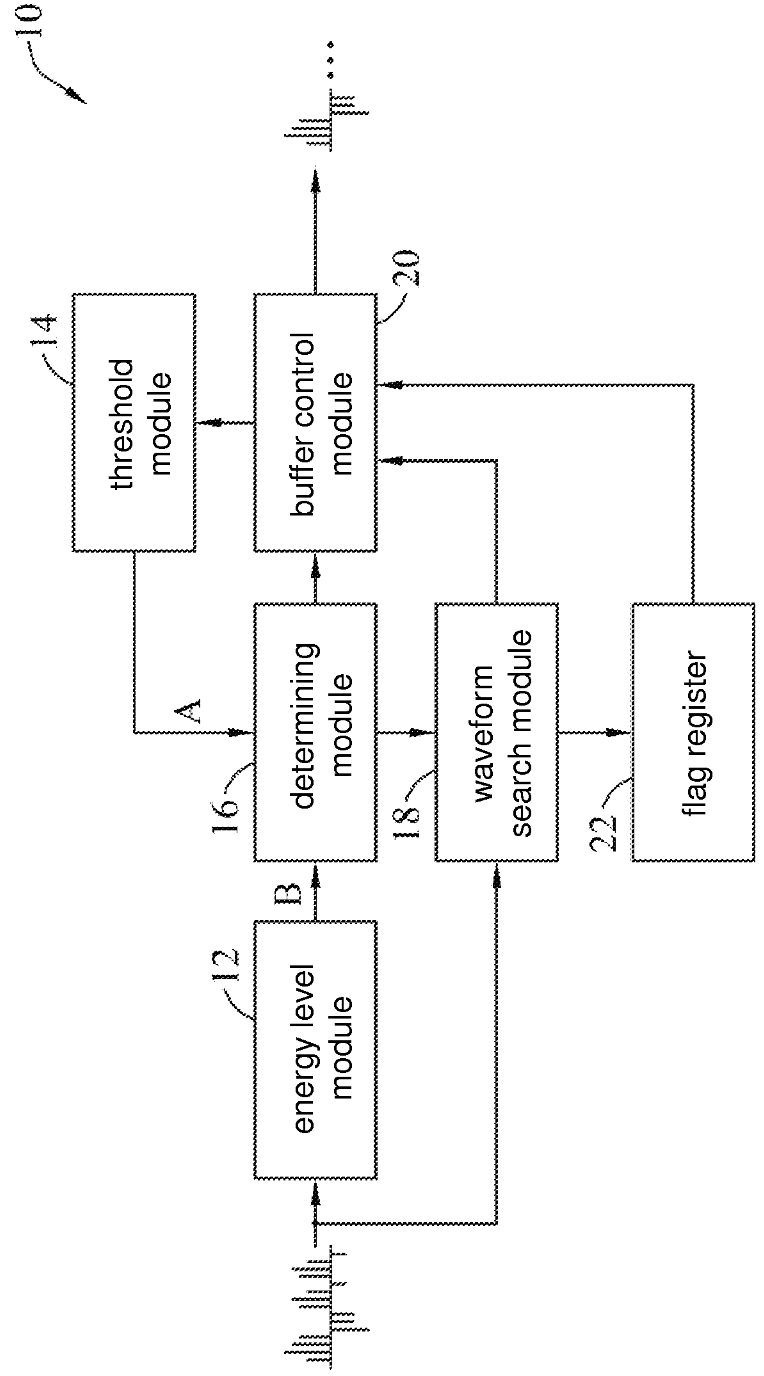
FIG. 3 is an apparatus for audio time stretch according to an embodiment of the present invention.

FIG. 3 shows a block diagram of an audio time stretch apparatus 10 applicable for performing the method for audio time stretch illustrated in FIG. 2 according to an embodiment of the present invention. The apparatus 10 comprises an energy level module 12, a determining module 16, a waveform search module 18, a threshold module 14, a flag register 22 and a buffer control module 20. The energy level module 12 calculates a corresponding energy level B according to amplitudes of a plurality of audio data. The threshold module 14 provides a threshold A. The determining module 16 determines whether the waveform search module 18 performs a waveform search among the plurality of audio data according to the energy level B. For example, when the energy level B of the audio data is greater than the threshold A, the waveform search module 18 does not perform the waveform search among the audio data. When the energy level B is smaller than the threshold A, the waveform search module 18 performs the waveform search among the audio data, and identifies removable audio data and addible audio data from the audio data. A flag removeFlag and a flag addFlag in the flag register 22 are respectively set as an enable value with logic true.

The buffer control module 20 checks an audio repository. When the audio repository is greater than a water level and the flag removeFlag is logic true, the buffer control module 20 selectively removes the removable audio data from the audio data. In contrast, when the audio repository is lower than the water level and the flag addFlag is logic true, the buffer control module 20 selectively inserts the addible audio data into the audio data.

The threshold module 14 is capable of updating the threshold A for the current audio data according to one or more previous audio data (e.g., the energy level thereof). The apparatus 10 is implemented in the receiving end of Internet real-time audio/video transmission to receive digital audio data via a de-packetizing/decoding/demodulating mechanism (not shown) and output the buffered audio data to a digital-to-analog conversion mechanism (not shown). The apparatus 10 may be implemented by software, firmware and/or hardware.

In conclusion, in the present invention, audio time stretch is performed according to an energy level, and parts with lower energy level and volume are utilized to perform time stretch, so that effects due to time stretch are likely to stay unnoticed to a listener to effectively reduce audio quality degradation resulted from time stretch. Although the Internet real-time audio/video transmission is take as an example in the foregoing description, the present invention is applicable to various applications where audio time stretch is required. For example, the present invention may be applied to applications of language learning and conversions of speech to text to accelerate or delay a speech speed without changing a pitch.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for audio time stretch implemented by an executable program stored in a non-transitory computer-readable storage medium to instruct a microprocessor of an apparatus for audio time stretch, comprising:

receiving a plurality of first audio data and a plurality of second audio data;

calculating an energy level according to amplitudes of the first data;

selectively performing a waveform search for the first audio data according to the energy level for waveform similarities;

duplicating a section of an audio data to extend an audio output according to a search result where an audio repository is smaller than a water level;

wherein the step of selectively performing the waveform search comprises:

selecting a plurality of third audio data from the first audio data as removable audio data according to waveform similarities in the first audio data; and selecting a plurality of fourth audio data from the first audio data as addible audio data according to waveform similarities in the first audio data.

2. The method according to claim 1, further comprising:

performing the waveform search when the energy level is smaller than a threshold; and stopping the waveform search when the energy level is greater than the threshold.

3. The method according to claim 2, further comprising:

updating the threshold according to the energy level of said plurality of second audio data; and selectively performing the waveform search for the second audio data according to whether amplitudes of the second audio data are smaller than the updated threshold.

4. The method according to claim 1, wherein the step of selectively performing the waveform search further comprises:

setting a removable flag as an enable value for the removable audio data in the first audio data.

5. The method according to claim 4, further comprising:

checking a repository; and removing the removable audio data from the first audio data when the repository is greater than said water level and the removable flag matches the enable value.

6. The method according to claim 5, wherein the step of selectively performing the waveform search comprises:

setting an addible flag as an enable value for the addible audio data in the first audio data.

7. The method according to claim 6, wherein the step of duplicating audio data comprises:

checking a repository; and duplicating the addible audio data when the addible flag matches the enable value.

8. An apparatus, including a non-transitory computer-readable storage medium with an executable program stored thereon, wherein said executable program instructs to perform audio time stretch, comprising:

an energy level module, for calculating an energy level according to amplitudes of a plurality of first audio data and a plurality of second audio data;

a determining module, coupled to the energy level module, for determining whether to perform a waveform search among the first audio data according to the energy level to output a determination result; wherein said determining module duplicates a section of an audio data to extend an audio output according to a search result where an audio repository is smaller than a water level; and a waveform search module, coupled to the determining module;

wherein the waveform search module selects a plurality of third audio data from the first audio data as removable audio data according to waveform similarities in the first audio data, and the waveform search module selects a plurality of fourth audio data as addible audio data from the first audio data according to waveform similarities in the first audio data.

9. The apparatus according to claim 8, wherein said waveform search module selectively performs the waveform search according to the determination result.

10. The apparatus according to claim 9, further comprising:

a threshold module, for providing a threshold;

wherein, the determining module compares the energy level with the threshold, and the waveform search module performs the waveform search among the first audio data when the energy level is smaller than the threshold and stops the waveform search when the energy level is greater than the threshold.

11. The apparatus according to claim 10, wherein when the energy level module calculates a second energy level according to amplitudes of said plurality of second audio data, the threshold module updates the threshold according to the energy level, and the determining module compares the second energy with the updated threshold to determine whether the waveform search module performs the waveform search among the second audio data.

12. The apparatus according to claim 9, further comprising a flag register for recording a removable flag; wherein, the removable flag is set as an enable value for the removable audio data.

13. The apparatus according to claim 12, further comprising a buffer control module for checking an audio repository; wherein, the buffer control module removes the removable audio data from the first audio data when the audio repository is greater than a water level and the removable flag matches the enable value.

14. The apparatus according to claim 9, further comprising a flag register for recording an addible flag; wherein, the addible flag is set as an enable value for the addible audio data.

15. The apparatus according to claim 14, further comprising a buffer control module for checking an audio repository; wherein, the buffer control module inserts the addible audio data to the first audio data when the audio repository is smaller than a water level and the addible flag matches the enable value.

16. The method according to claim 1, wherein the waveform search comprises a waveform similarity based synchronized overlap-add (WSOLA) algorithm.

17. The apparatus according to claim 8, wherein the waveform search comprises a waveform similarity based synchronized overlap-add (WSOLA) algorithm.

* * * * *